United States Patent
Jaradi et al.

(10) Patent No.: US 11,535,186 B2
(45) Date of Patent: Dec. 27, 2022

(54) AIRBAG ASSEMBLY

(71) Applicant: Ford Global Technologies, LLC, Dearborn, MI (US)

(72) Inventors: Dean M. Jaradi, Macomb, MI (US); S.M. Iskander Farooq, Novi, MI (US); Anil Kalra, Canton, MI (US); Mohammad Omar Faruque, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/136,456

(22) Filed: Dec. 29, 2020

(65) Prior Publication Data

US 2022/0203923 A1     Jun. 30, 2022

(51) Int. Cl.
| | |
|---|---|
| *B60R 21/231* | (2011.01) |
| *B60R 21/214* | (2011.01) |
| *B60R 21/264* | (2006.01) |
| *A61G 3/08* | (2006.01) |
| *B60N 3/00* | (2006.01) |

(52) U.S. Cl.
CPC ......... *B60R 21/231* (2013.01); *A61G 3/0808* (2013.01); *B60N 3/001* (2013.01); *B60N 3/002* (2013.01); *B60R 21/214* (2013.01); *B60R 21/264* (2013.01); *B60R 2021/23153* (2013.01)

(58) Field of Classification Search
CPC ... B60R 21/231; B60R 21/214; B60R 21/264; B60R 21/213; B60R 2021/23153; B60N 3/001; B60N 3/002; A61G 3/0808; A61G 3/08
USPC ....................................... 280/730.1
See application file for complete search history.

(56) References Cited

U.S. PATENT DOCUMENTS

| | | | | |
|---|---|---|---|---|
| 3,664,682 | A * | 5/1972 | Wycech | B60R 21/08 280/734 |
| 10,285,880 | B1 | 5/2019 | Ghannam et al. | |
| 10,589,708 | B2 * | 3/2020 | Cho | B60R 21/0136 |
| 2019/0161049 | A1 * | 5/2019 | Thomas | B60R 21/215 |
| 2020/0023801 | A1 | 1/2020 | Takemura et al. | |
| 2020/0406852 | A1 * | 12/2020 | Fischer | B60R 21/2338 |

FOREIGN PATENT DOCUMENTS

| | | | |
|---|---|---|---|
| JP | 2556529 Y2 * | 12/1997 | |
| WO | 198603130 A1 | 6/1986 | |

* cited by examiner

*Primary Examiner* — Keith J Frisby
(74) *Attorney, Agent, or Firm* — Frank A. MacKenzie; Bejin Bieneman PLC (57) ABSTRACT

A vehicle includes a floor defining a seating area. The vehicle includes a roof above the floor. The vehicle includes a panel supported by the roof and pivotable from a stowed position at the roof to a deployed position in front of the seating area. The vehicle includes an airbag supported by the panel and inflatable from an uninflated position to an inflated position. The vehicle includes a pyrotechnic inflator in fluid communication with the airbag.

20 Claims, 7 Drawing Sheets

AIRBAG ASSEMBLY

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

A vehicle includes a floor defining a seating area. The vehicle includes a roof above the floor. The vehicle includes a panel supported by the roof and pivotable from a stowed position at the roof to a deployed position in front of the seating area. The vehicle includes an airbag supported by the panel and inflatable from an uninflated position to an inflated position. The vehicle includes a pyrotechnic inflator in fluid communication with the airbag.

The panel in the deployed position may include a proximate end at the roof and a distal end spaced from the roof, the airbag being closer to the distal end than the proximate end.

The vehicle may include a tray table supported by the panel.

The tray table may be movable between a table stowed position and a table deployed position.

The airbag in the inflated position may urge the tray table toward the table stowed position.

The tray table may include a bottom surface that faces the floor in the table deployed position, and wherein the airbag in the inflated position abuts the bottom surface of the tray table.

The airbag in the uninflated position may be below the tray table when the panel is in the deployed position.

The airbag in the inflated position may include a pair of side bolsters and a depression between the side bolsters.

The pair of side bolsters and the depression may be elongated along a vertical axis.

The pair of side bolsters and the depression may face the seating area.

The airbag in the inflated position may enclose an inflation chamber that surrounds a passage elongated between a pair of open ends.

The passage may be outside the inflation chamber.

The vehicle may include a brace connected to the panel and the roof.

The brace may extend transverse to the roof and the panel in the deployed position.

The brace may extend forward from the panel, away from the seating area, and toward the roof.

The brace may be slidable along at least one of the roof or the panel.

The vehicle may include a lock operatively engaged with the brace to selectively maintain the panel in the deployed position.

The panel in the stowed position may be parallel to the roof, and in the deployed position may be transverse to the roof.

The vehicle may include a vehicle seat supported by the floor within the seating area.

The vehicle may include a personal mobility device attachment assembly supported by the floor within the seating area.

With reference to FIGS. 1-6, wherein like numerals indicate like parts throughout the several views, a vehicle 20 includes a floor 22 defining a seating area 24. The vehicle 20 includes a roof 26 above the floor 22. The vehicle 20 includes a panel 28 supported by the roof 26 and pivotable from a stowed position at the roof 26 to a deployed position in front of the seating area 24. The vehicle 20 includes an airbag 30 supported by the panel 28 and inflatable from an uninflated position to an inflated position. The vehicle 20 includes a pyrotechnic inflator 32 (shown in FIGS. 5 and 7) in fluid communication with the airbag 30. The panel 28 in the deployed position may position and support the airbag 30 in the inflated position to control kinematics of an occupant seated in the seating area 24, e.g. on a seat 34 or a personal mobility device 36. The panel 28 in the stowed position may provide increased storage capability and/or visibility within a passenger compartment 38 of the vehicle 20.

In the present description, relative vehicular orientations and directions (by way of example, top, bottom, front, rear, outboard, inboard, inward, outward, lateral, left, right, etc.) are from the perspective of an occupant seated in the vehicle 20 facing forward, e.g., toward a forward instrument panel and/or forward windshield of the vehicle 20. The forward direction of the vehicle is the direction of movement of the vehicle 20 when the vehicle 20 is engaged in forward drive with wheels of the vehicle straight.

The vehicle 20 may be any suitable type of automobile, e.g., a passenger or commercial automobile such as a sedan, a coupe, a truck, a sport utility, a crossover, a van, a minivan, a taxi, a bus, etc. The vehicle 20, for example, may be autonomous. In other words, the vehicle 20 may be autonomously operated such that the vehicle 20 may be driven without constant attention from a driver, i.e., the vehicle 20 may be self-driving without human input.

The vehicle 20 defines a longitudinal axis A1 extending between a front and a rear of the vehicle 20. The vehicle 20 defines a lateral axis A2 extending between a right side and a left side of the vehicle 20. The vehicle 20 defines a vertical axis A3 extending between a top and a bottom of the vehicle 20. The longitudinal axis A1, the lateral axis A2, and the vertical axis A3 are perpendicular relative to each other.

The vehicle 20 may include a body 40. The body 40 includes body panels partially defining an exterior of the vehicle 20. The body 40 panels may present a class-A surface, e.g., a finished surface exposed to view by a customer and free of unaesthetic blemishes and defects. The body 40 includes, e.g., the floor 22, the roof 26, one or more pillars, etc. The roof 26 may extend along the longitudinal axis A1 and the lateral axis A2. The roof 26 is above and spaced from the floor 22 along the vertical axis A3.

The body 40 may define the passenger compartment 38 to house occupants, if any, of the vehicle 20. The passenger compartment 38 may extend across the vehicle 20, i.e., from the right side to the left side of the vehicle 20. The passenger compartment 38 includes a front end and a rear end with the front end being in front of the rear end during forward movement of the vehicle 20. The passenger compartment 38 is between the roof 26 and the floor 22 along the vertical axis A3.

The floor 22 of the vehicle 20 supports objects, such as seats, occupants, the personal mobility device 36, etc., within the passenger compartment 38. The floor 22 may extend from the front end to the rear end of the passenger compartment 38 and from the right side to the left side of the vehicle 20. The floor 22 defines the seating area 24. The seating area 24 designates positions in the passenger compartment 38 for the occupant to occupy. For example, the seating area 24 may be defined by anchors 42 of the floor 22. The anchors 42 may include fasteners, reinforcement plates, etc. The anchors 42 may be connected to the seat 34 and/or a personal mobility device attachment assembly 44 supported by the floor 22 within the seating area 24. The seating area 24 may surround the anchors 42.

Figure 2:
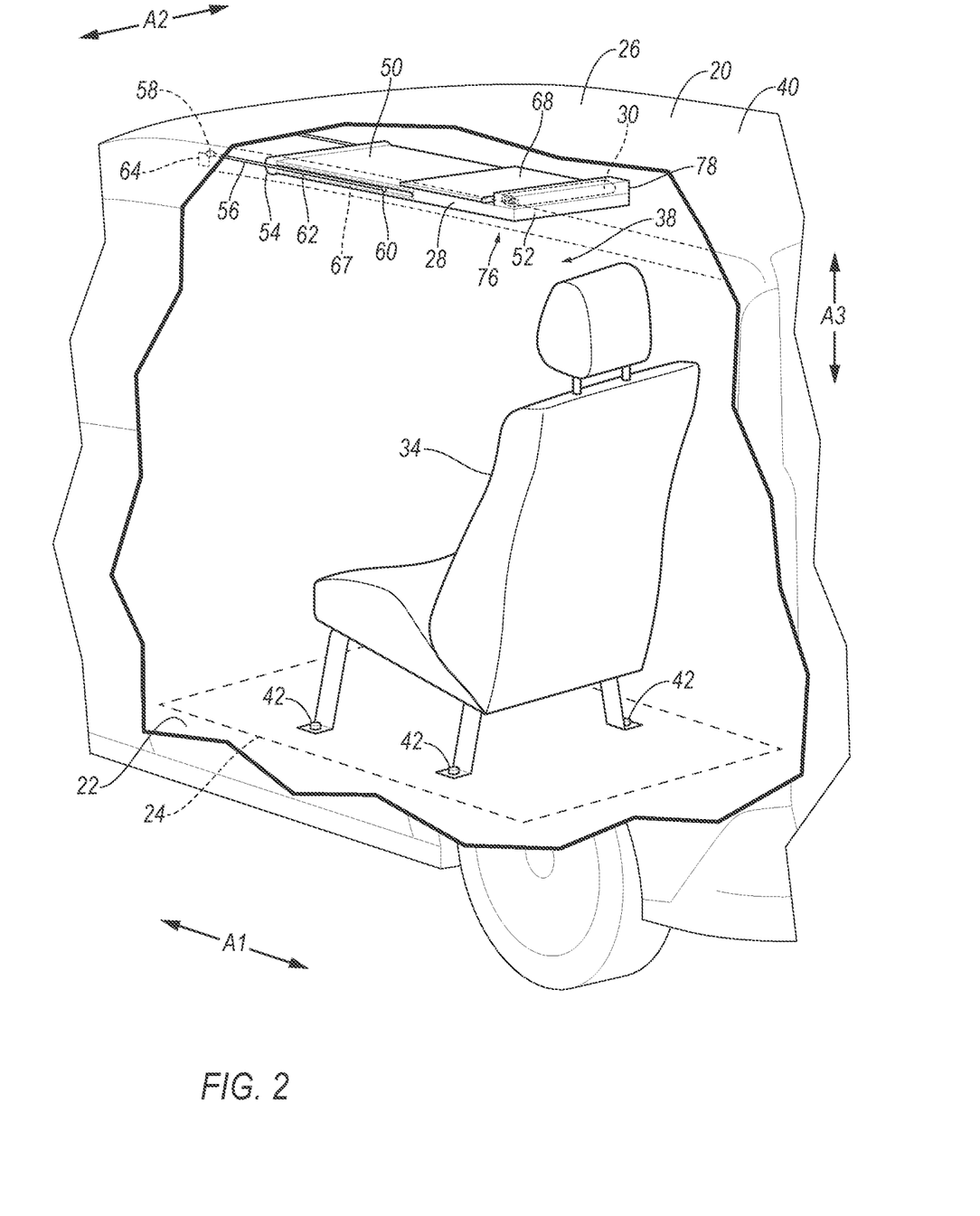
FIG. 2 is a perspective view of the vehicle supporting a seat and having the airbag supported by the panel in the stowed position.

The seat 34, shown in FIG. 2, includes a seatback and a seat bottom (not numbered). The seatback may be supported by the seat bottom and may be stationary or movable relative to the seat bottom. The seatback and the seat bottom may be adjustable in multiple degrees of freedom. Specifically, the seatback and the seat bottom may themselves be adjustable, in other words, adjustable components within the seatback and/or the seat bottom, and/or may be adjustable relative to each other. The seatback may include a seatback frame and a covering supported on the seatback frame. The seatback frame may include tubes, beams, etc. Specifically, the seatback frame includes a pair of upright frame members. The upright frame members are elongated, and specifically, are elongated in a generally upright direction when the seatback is in a generally upright position. The upright frame members are spaced from each other and the seatback frame includes cross-members (not shown) extending between the upright frame members. The seatback frame, including the upright frame members, may be of any suitable plastic material, e.g., carbon fiber reinforced plastic (CFRP), glass fiber-reinforced semi-finished thermoplastic composite (organosheet), etc. As another example, some or all components of the seatback frame may be formed of a suitable metal, e.g., steel, aluminum, etc. The covering may include upholstery and padding. The upholstery may be cloth, leather, faux leather, or any other suitable material. The upholstery may be stitched in panels around the frame. The padding may be between the covering and the seatback frame and may be foam or any other suitable material. The seat 34 may be removable and/or foldable, e.g., to provide space for the personal mobility device 36. The seat 34 may rotate, e.g., to face the front or the rear of the vehicle 20.

Figure 1:
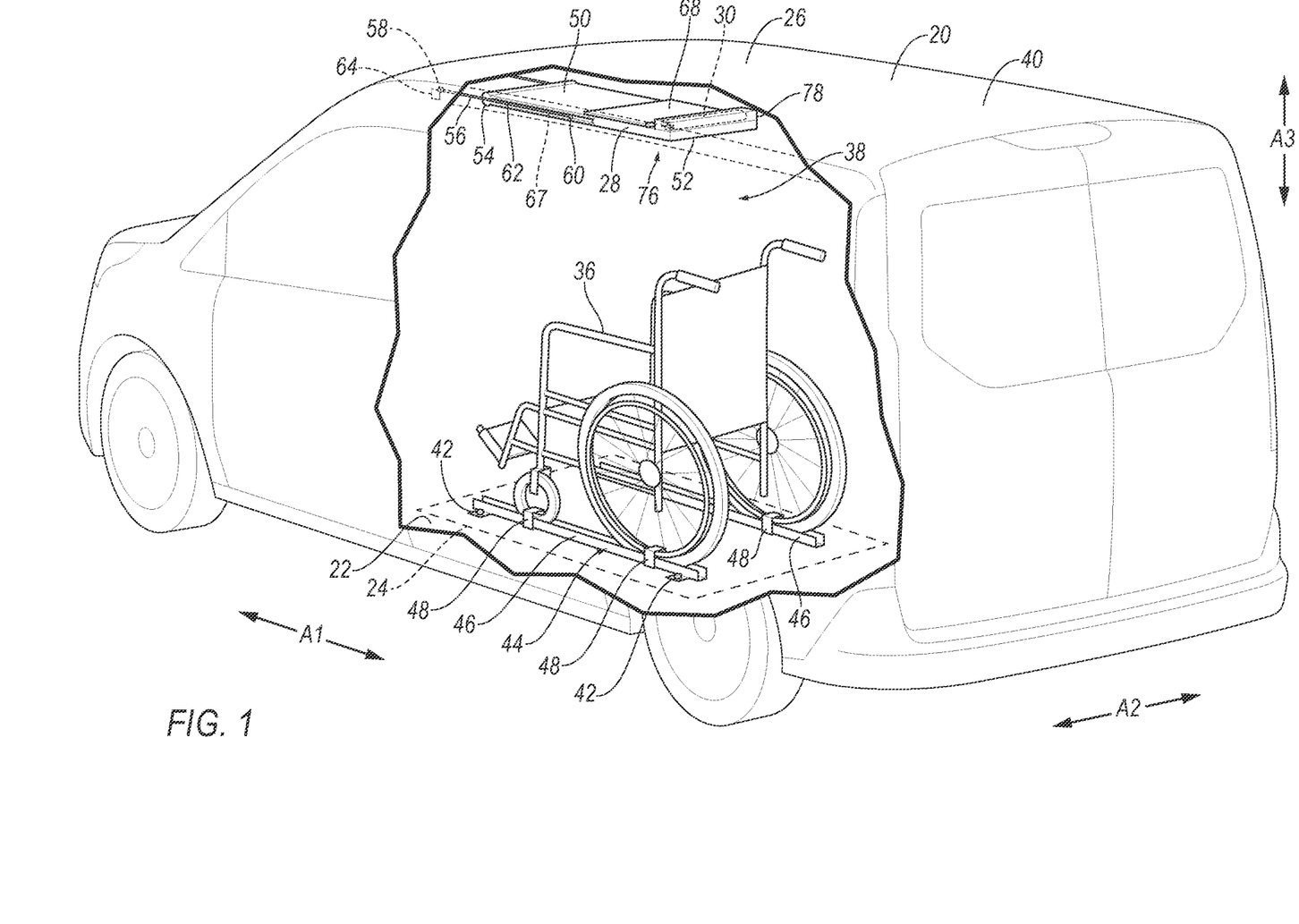
FIG. 1 is a perspective view of a vehicle supporting a personal mobility device and having an airbag supported by a panel in a stowed position.
Figure 3:
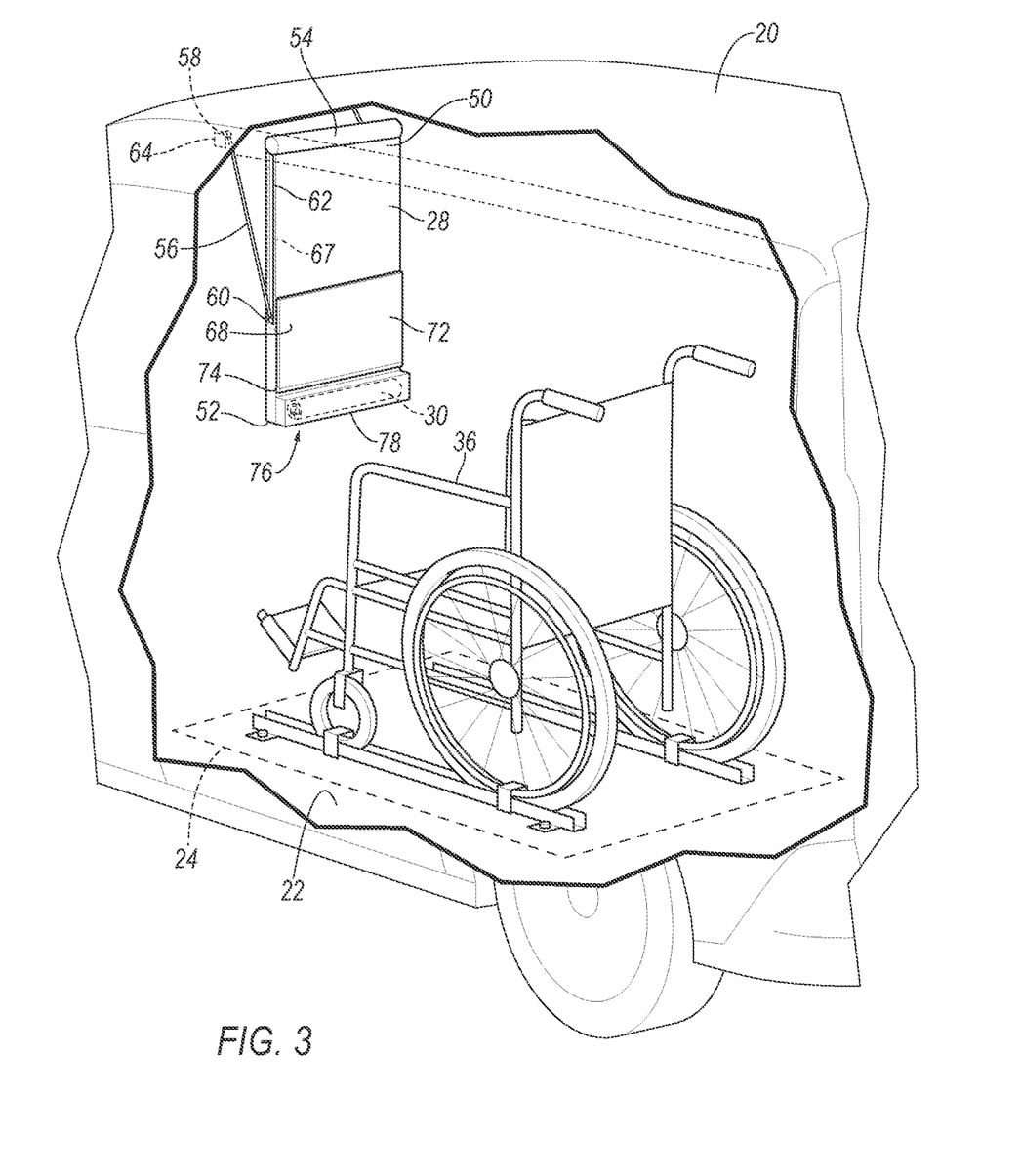
FIG. 3 is a perspective view of the vehicle having the airbag supported by the panel in a deployed position.

The personal mobility device attachment assembly 44, shown, for example, in FIGS. 1 and 3, secures the personal mobility device 36 within the passenger compartment 38. The personal mobility device attachment assembly 44 may include channels 46 designed to engage wheels of the personal mobility device 36. Specifically, the channels 46 are sized and shaped to receive wheels of the personal mobility device 36 such to resist lateral movement of the personal mobility device 36 during operation of the vehicle 20. The channels 46 may be spaced from each other along the lateral axis A2 and parallel to each other along the longitudinal axis A1. The channels 46 may be fixed to the floor 22 via the anchors 42. The personal mobility device attachment assembly 44 may include suitable number of latches 48, tethers, etc., to secure the wheels or other structure of the personal mobility device 36 to the vehicle 20 and limit relative movement therebetween. The latches 48 may limit the movement of the personal mobility device 36 in the channels 46, e.g., via engagement with the wheels. The latches 48 may be electronic or manual, e.g., each latch 48 may include a solenoid. Actuation of the solenoid may engage the latch 48 with the wheel.

The personal mobility device 36 may be of any suitable type that supports a seated occupant and provides mobility to the seated occupant, i.e., the personal mobility device 36 transports the seated occupant outside of the vehicle 20 and moves the seated occupant in the passenger compartment 38 during ingress to and egress from the vehicle 20. The personal mobility device 36 supports the seated occupant in the passenger compartment 38 during operation of the vehicle 20. The personal mobility device 36 may include wheels, as described above. As examples including wheels, the personal mobility device 36 may be a wheelchair or a scooter. As another example, the personal mobility device 36 may include a continuous track. In such an example, the continuous track is in contact with ground and personal mobility device 36 may include wheels that transmit force to the continuous track. The personal mobility device 36 may include a motor operably connected to the wheels and a battery that provides power to the motor. The personal mobility device 36 may be for example, a wheelchair, an electric scooter, etc.

The panel 28 is generally planar, extending from a first end 50 to a second end 52. The panel 28 may be elongated between the first end 50 and the second end 52. The panel 28 is pivotally supported by the roof 26, i.e., such that the panel 28 can pivot relative to the roof 26. For example, a hinge 54 may connect the first end 50 of the panel 28 to the roof 26. The panel 28 may pivot at the hinge 54 from the stowed position to the deployed position, and vice versa.

The panel 28 in the stowed position is at the roof 26, e.g., the first end 50 and the second end 52 may be at the roof 26. The panel 28 in the stowed position may be parallel to the roof 26. For example, the panel 28 and the roof 26 may both extend along the longitudinal axis A1 and the lateral axis A2. As another example, in the stowed position the first end 50 and the second end 52 of the panel 28 may be proximate the roof 26. The first end 50 of the panel 28 may be forward of the second end 52 of the panel 28.

The panel 28 in the deployed position is in front of the seating area 24, e.g., along the longitudinal axis A1. The panel 28 in the deployed position extends transversely from the roof 26. For example, the panel 28 in the deployed position may extend along vertical axis A3 perpendicular to the roof 26 extending along the longitudinal axis A1. In the deployed position, the first end 50 may be proximate the roof 26, e.g., connected at the hinge 54, and the second end 52 may be distal, e.g., spaced from the roof 26 along the vertical axis A3. In other words, the first end 50 may be between the roof 26 and the second end 52 along the vertical axis A3 when the panel 28 is in the deployed position.

A brace 56 may be connected to the panel 28 and the roof 26. The brace 56 supports the panel 28 in the deployed position, e.g., to reduce movement of the panel 28 during an impact to the vehicle 20. For example, the brace 56 may enable the panel 28 to provide a stiffer reaction surface to the airbag 30 in the inflated position. The brace 56 may be elongated between a first end 58 and a second end 60. The brace 56 may extend forward from the panel 28. The brace 56 may extend away from the seating area 24, e.g., toward the front of the vehicle 20. For example, the first end 50 end of the panel 28 may be at, or forward of, a forward edge of the seating area 24 relative to the longitudinal axis A1 and the first end 58 of the brace 56 may be forward of the panel 28 along the longitudinal axis A1.

The brace 56 may extend parallel to the panel 28 in the stowed position. For example, the first end 58 and the second end 60 may be spaced from each other along the longitudinal axis A1 and proximate the roof 26 while the panel 28 is in the stowed position.

The brace 56 may extend transverse to the roof 26 and the panel 28 in the deployed position. The brace 56 may extend from the panel 28 toward the roof 26. For example, the first end 58 of the brace 56 may be at the roof 26 forward of the panel 28 and the second end 60 of the brace 56 may be at the panel 28 below, and spaced from, the roof 26. The brace 56 may be elongated diagonally therebetween.

The brace 56 may be slidable along at least one of the roof 26 or the panel 28. Sliding the brace 56 enables the panel 28 to be moved from the stowed position to the deployed position and vice versa. For example, the brace 56 and/or the panel 28 may include a slot 62 (shown in the panel 28). The second end 60 of the brace 56 may be slidable and rotatable via a pin fixed to the second end 60 and supported in the slot 62. The pin may be at one end of the slot 62 when the panel 28 is in the stowed position, and at an opposite end of the slot 62 when the panel 28 is in the deployed position. The first end 58 of the brace 56 may be rotationally supported by the roof 26. Additional or alternatively, the roof 26 may include a slot and the first end 58 of the brace 56 may be slidable and rotatable via a pin fixed to the first end 58 and supported in the slot of the roof 26 (not shown).

A lock 64 may be operatively engaged with the brace 56 to selectively maintain the panel 28 in the deployed position, e.g., inhibiting motion of the brace 56 relative to the panel 28 and/or the roof 26 during an impact to the vehicle 20. The lock 64 may be supported by the roof 26. The lock 64 may be supported by the panel 28 (not shown). The lock 64 may engage the brace 56 when the vehicle 20 is subject to deceleration above a threshold. For example, the lock 64 may be an inertia actuated lock that includes a weighted pawl, a ratchet gear, a spring, etc. Inertia may urge the pawl into engagement with the gear and inhibit rotation of the brace 56 relative to the roof 26 and/or panel 28 when the vehicle 20 is subject to deceleration above the threshold. The lock 64 may include a solenoid or other electromechanical structure that actuates to engage the lock 64 with the brace 56 to inhibit motion, e.g., in response to receiving a command from a computer 66.

The vehicle 20 may include an actuator 67 configured to move the panel 28 from the stowed position to the deployed position, and vice versa. The actuator 67 may be any suitable electro-mechanical, pneumatic, and/or hydraulic device. The actuator 67 may be supported by, e.g., fixed to, the roof 26 or the panel 28. The actuator 67 may apply force to the brace 56, to linearly move the brace 56 along the slot 62. For example, the actuator 67 may include a motor operatively coupled to a rack and pinion assembly. The rack of the rack and pinion assembly may be fixed to the panel 28 and the pinion may be fixed to the second end 60 of the brace 56. Rotation of the pinion, e.g., by the motor, may move the second end 60 of the brace 56 relative to the rack and along the slot 62. As another example, the actuator 67 may include a hydraulic or pneumatic piston and cylinder, a worm screw, etc. The actuator 67 may apply torque to the panel 28 and/or the brace 56, e.g., to rotate the panel 28 and/or brace 56 relative to the roof 26. For example, the actuator 67 may include a motor, reduction gears, servo, etc. The actuator 67 may move the panel 28 from the stowed position to the deployed position, or vice versa, in response to receiving a command from the computer 66.

A tray table 68 may be supported by the panel 28. The tray table 68 provides a working surface to the occupant of the vehicle 20. For example, the occupant may use the working surface to support a smart phone, tablet computer, book, food and drink, etc. The tray table 68 may be generally planar. The tray table 68 may include a top surface 70 opposite a bottom surface 72. The tray table 68 may be pivotally supported by the panel 28, e.g., via a hinge 74. The tray table 68 may be movable between a table stowed position and a table deployed position. For example, the tray table 68 may pivot about the hinge 74 to move from the table stowed position and to the table deployed position, and vice versa. The tray table 68 may be closer to the second end 60 of the panel 28 than the first end 58 of the panel 28.

The tray table 68 in the table stowed position, shown, for example, in FIG. 3, may extend parallel to the panel 28. The top surface 70 of the table 68 in the table stowed position may face the panel 28. The top surface 70 of the table 68 in the table stowed position may abut the panel 28.

Figure 4:
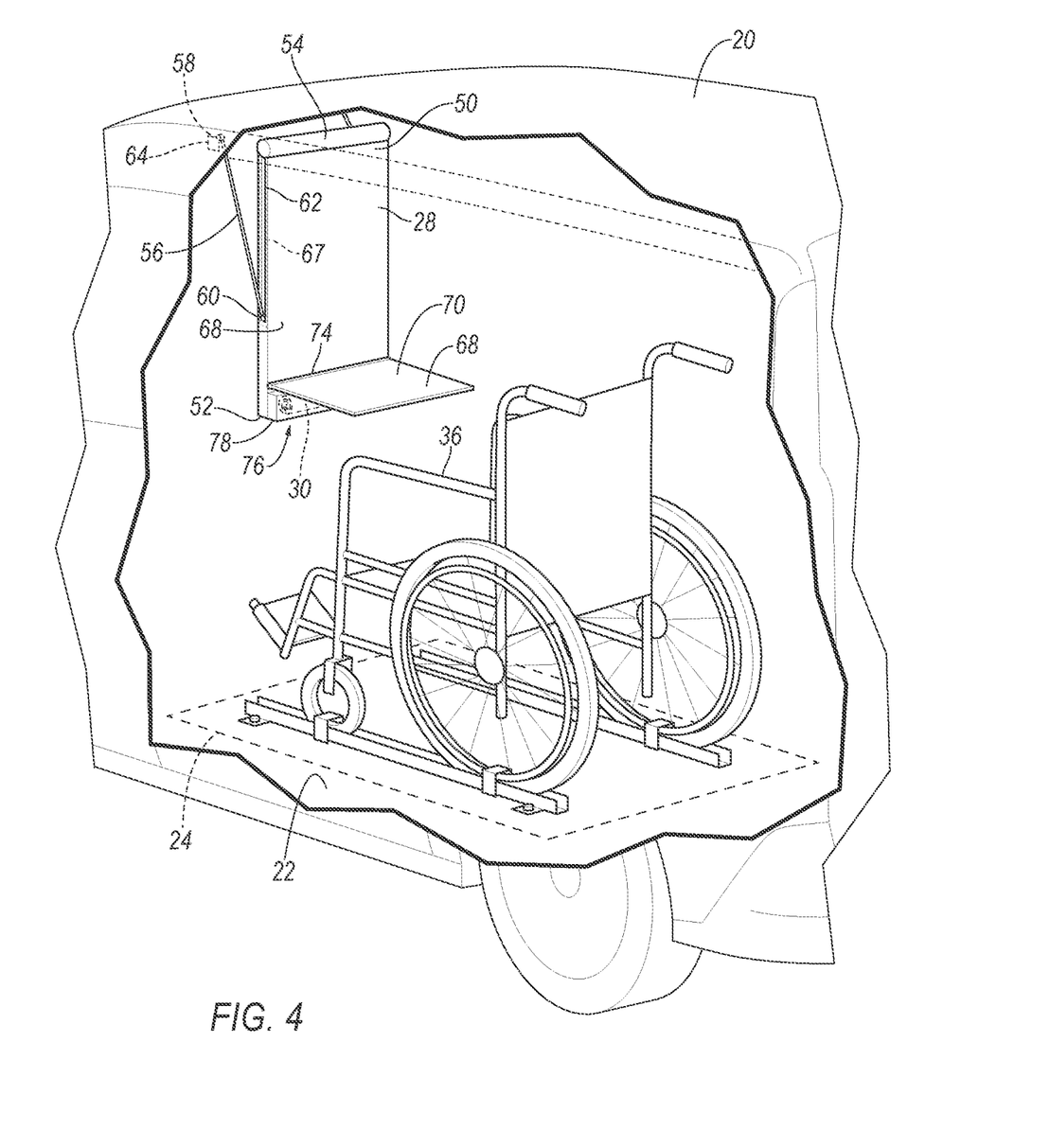
FIG. 4 is a perspective view of the vehicle having the airbag supported by the panel in the deployed position and a tray table in a deployed position.
Figure 5:
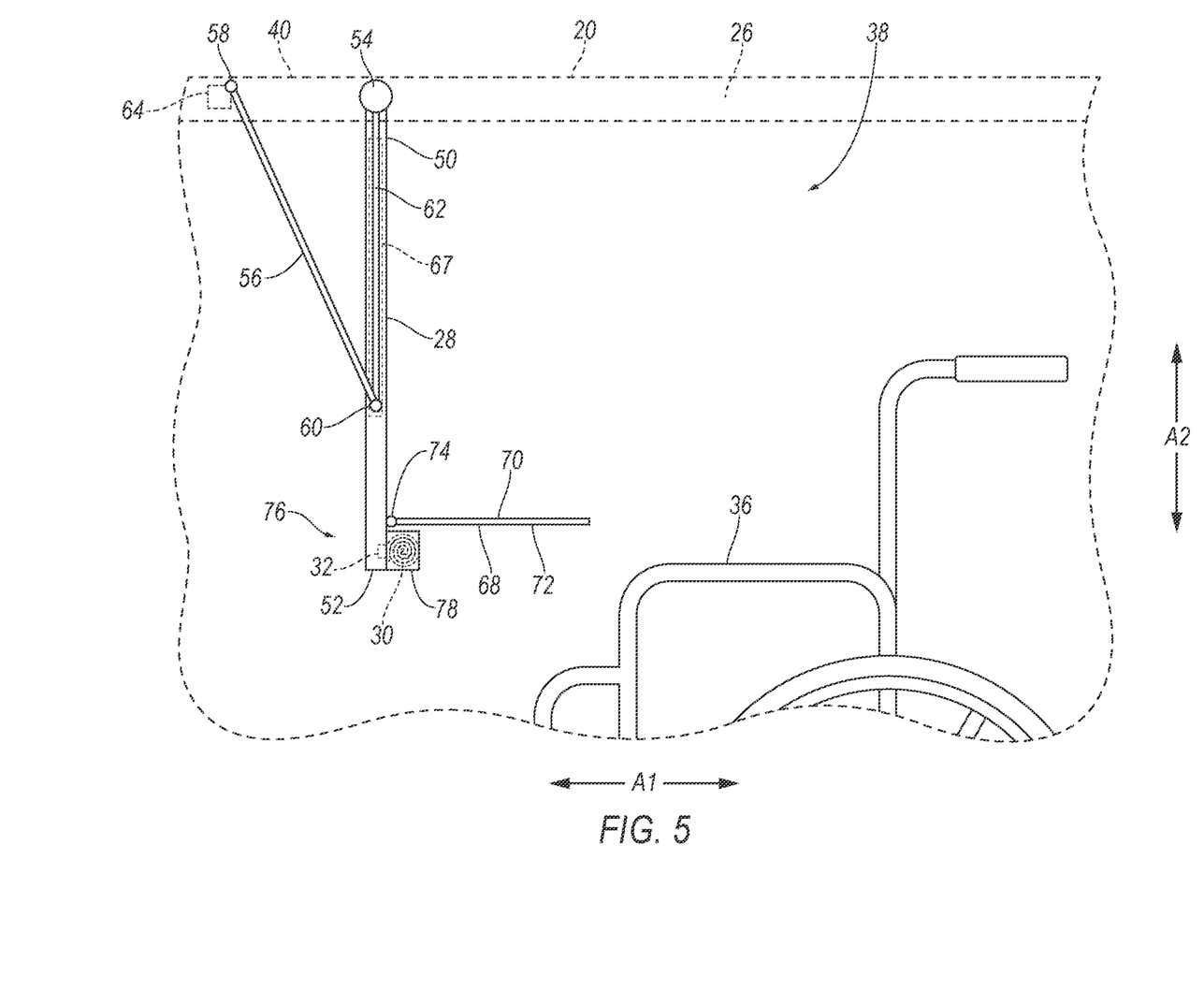
FIG. 5 is a side view of the vehicle having the airbag supported by the panel in the deployed position and a tray table in the deployed position.

The tray table 68 in the table deployed position, shown in FIGS. 4 and 5, may extend transversely from the panel 28. For example, the tray table 68 in the table deployed position may extend perpendicular to the panel 28. The bottom surface 72 of the tray table 68 in the table deployed position may face the floor 22 of the vehicle 20 when the panel 28 is in the deployed position. The top surface 70 of the tray table 68 in the table deployed position may face upward when the panel 28 is in the deployed position, e.g., proving the working surface to the occupant.

An airbag assembly 76 may be supported by the panel 28. The airbag assembly 76 includes the airbag 30 and the pyrotechnic inflator 32. The airbag assembly 76 may include an airbag housing 78. The pyrotechnic inflator 32 inflates the airbag 30 to the inflated position, as described further below.

The airbag 30 may be woven nylon yarn, for example, nylon 6, 6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The airbag 30 may be supported by the panel 28. The airbag 30 may be closer to the second end 52 of the panel 28 than the first end 50 of the panel 28. The airbag 30 in the uninflated position may be between the tray table 68 and the second end 60 of the panel 28. For example, the airbag 30 in the uninflated position may be between the tray table 68 and the floor 22 when the panel 28 is in the deployed position, as shown, for example, in FIG. 5.

In an example in which the airbag assembly 76 includes the airbag housing 78, the airbag 30 is supported via the airbag housing 78. The airbag housing 78 houses the airbag 30 in an uninflated position and supports the airbag 30 in an inflated position. The airbag 30 may be rolled and/or folded to fit within the airbag housing 78 in the uninflated position. The airbag housing 78 may be of any suitable material, e.g., a rigid polymer, a metal, a composite, or a combination of rigid materials. The housing 78 may be fixed to the panel 28.

Figure 6:
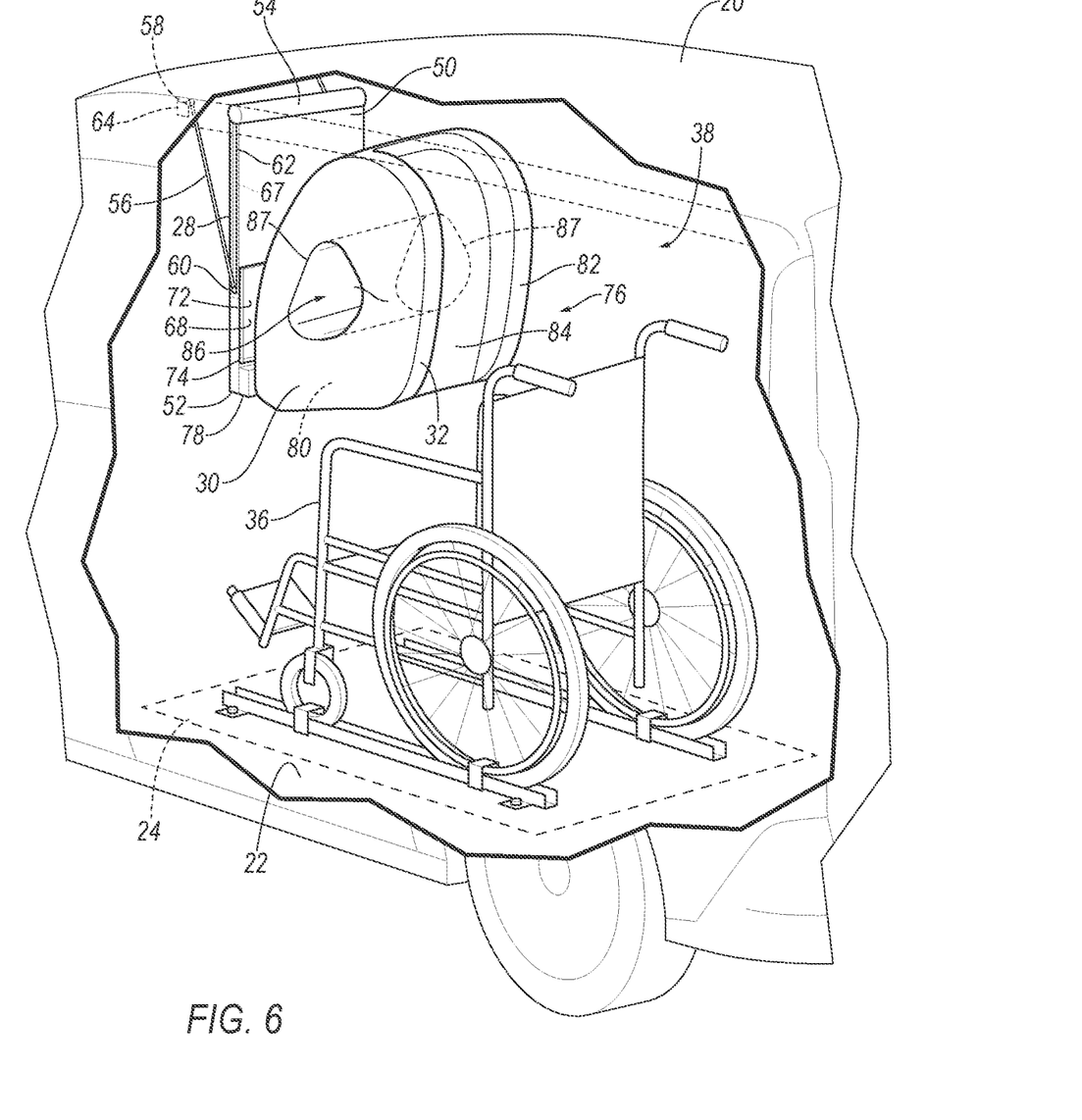
FIG. 6 is a perspective view of the vehicle having the airbag in an inflated position.

The airbag 30 is inflatable from the uninflated position, shown in FIGS. 1-5, to the inflated position, shown in FIG. 6. The airbag 30 in the uninflated position may be rolled at the second end 52 of the panel 28 below the bottom surface 72 of the tray table 68. The airbag 30 in the inflated position may urge the tray table 68 toward the table stowed position. The airbag 30 in the inflated position may abut the bottom surface 72 of the tray table 68. For example, the airbag 30 in the uninflated position may be below the table 68 when the panel 28 is in the deployed position. When inflated, the airbag 30 increases in volume and unrolls, moving from the uninflated position to the inflated position. The airbag 30 may inflate into abutment with the bottom surface 72 of the tray table 68 in the table deployed position. Further inflation of the airbag 30 may apply force to the bottom surface 72, urging the tray table 68 upward toward the table stowed position.

With reference to FIG. 6, the airbag 30 in the inflated position encloses an inflation chamber 80. The inflation chamber 80 receives inflation medium from the inflator 32. For example, one or more sheets of woven material may be sewn, or otherwise fixed, to enclose the inflation chamber 80 and provide shape to the airbag 30 in the inflated position.

The airbag 30 in the inflated position can include a pair of side bolsters 82. The side bolsters 82 may be elongated along the vertical axis A3. The side bolsters 82 may be spaced from each other along the lateral axis A2, e.g., with a depression 84 between the side bolsters 82. The side bolsters 82 extend further rearward than the depression 84. The pair of side bolsters 82 and the depression 84 may face the seating area 24, e.g., a line extending generally normally from an outer surface of the airbag 30 at the side bolsters 82 and the depression 84 may extend away from the panel 28 and toward the seat 34, the anchors 42, the personal mobility device attachment assembly 44, etc. The side bolsters 82 may be spaced from each other based on dimensions of a 50th percentile crash test dummy, e.g., such that kinematics of shoulders of the dummy are controlled by the side bolsters 82 and kinematics of a head of the dummy are controlled at the depression 84 between the side bolsters 82.

The airbag 30 in the inflated position can define a passage 86 elongated between a pair of open ends 87. The passage 86 may be elongated along the lateral axis A2. The inflation chamber 80 may surround the passage 86, e.g., with the woven fabric enclosing the inflation chamber 80 therebetween. The passage 86 may be outside the inflation chamber 80, e.g., such that the airbag 30 retains the inflation medium from the inflator 32 in the inflation chamber 80 away from the passage 86. For example, the inflation chamber 80 may be free of being in fluid communication with the passage 86.

The pyrotechnic inflator 32 is in fluid communication with the airbag 30 such that fluid from the pyrotechnic inflator 32 may flow to the airbag 30. The pyrotechnic inflator 32 expands the airbag 30 with inflation medium, such as a gas, to move the airbag 30 from the uninflated position to the inflated position. The pyrotechnic inflator 32 may be supported by any suitable component. For example, the pyrotechnic inflator 32 may be supported by the housing 78. The pyrotechnic inflator 32 ignites a chemical reaction to generate the inflation medium. The pyrotechnic inflator 32 may be, for example, at least partially in the inflation chamber 80 to deliver inflation medium directly to the inflation chamber 80 or may be connected to the inflation chamber 80 through fill tubes, diffusers, etc.

Figure 7:
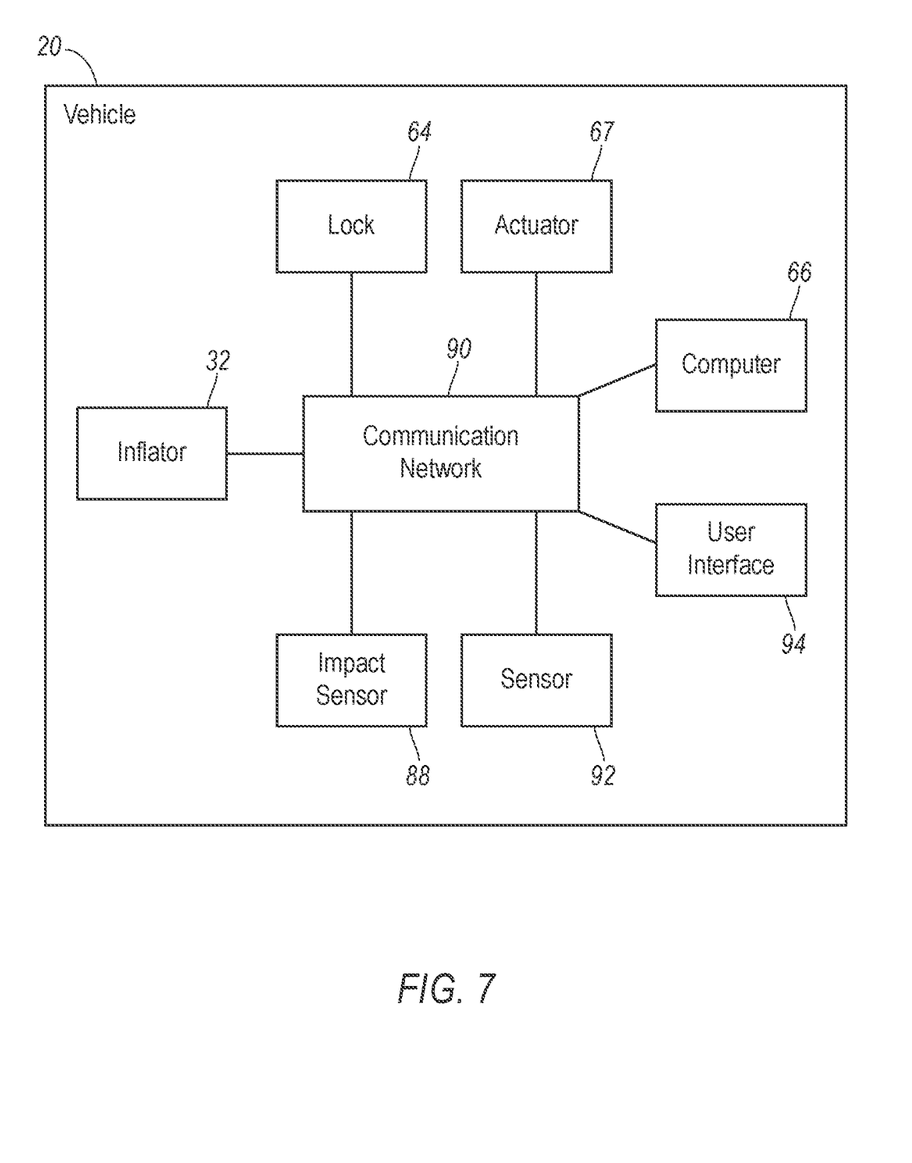
FIG. 7 is a block diagram of components of the vehicle.

With reference to FIG. 7, the vehicle 20 may include an impact sensor 88 programmed to detect an impact to the vehicle 20. The impact sensor 88 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 88 may be located at numerous points in or on the vehicle 20.

The vehicle 20 may include a sensor 92 configured to detect the personal mobility device 36 secured within the passenger compartment 38. The sensor 92 may include a contact switch, proximity sensor, or other suitable structure. For example, the sensor 92 may detect engagement of one or more of the latches 48. The sensor 92 may be in communication with the computer 66.

The vehicle 20 may include a user interface 94. The user interface 94 presents information to and/or receives information from an occupant of the vehicle 20. The user interface 94 may be located, e.g., on the instrument panel in a passenger cabin of the vehicle 20, or wherever may be readily accessed by the occupant. The user interface 94 may include dials, digital readouts, screens such as a touch-sensitive display screen, speakers, and so on for providing information to the occupant, e.g., human-machine interface (HMI) elements. The user interface 94 may include buttons, knobs, keypads, microphone, and so on for receiving information from the occupant. The user interface 94 may be in communication with the computer 66.

The computer 66, the lock 64, the impact sensor 88, the actuator 67, the sensor 92, the user interface 94, and the inflator 32 may be connected to a communication bus 90, such as a controller area network (CAN) bus, of the vehicle 20. The computer 66 may use information from the communication bus 90 to control the activation of the inflator 32, the actuator, and/or the lock 64. The inflator 32 and the lock 64 may be connected to the computer 66 via the communication bus 90 as shown in FIG. 7, or the inflator 32 may be connected directly to the computer 66 (now shown).

The computer 66 may be a microprocessor-based controller implemented via circuits, chips, or other electronic components. For example, the computer 66 may include a processor, memory, etc. The memory of the computer 66 may include memory for storing instructions executable by the processor for performing the functions described herein, as well as for electronically storing data and/or databases.

The computer 66 may control actuation of the inflator 32. For example, the computer 66 may transmit a command to the inflator 32 in response to receiving information from the impact sensor 88 indicating an impact to the vehicle 20.

The computer 66 may command the actuator 92 to move the panel 28 to the stowed position or the deployed position. For example, the computer 66 may command the actuator 92 to move the panel 28 to the stowed position or the deployed position in response to receiving information from the user interface 94 indicating such position. As another example, the computer 66 may command the panel 28 to the deployed position in response to receiving information from the sensor 92 indicating that the personal mobility device 36 is secured within the passenger compartment 38.

In operation under normal operating conditions of the vehicle 20, the airbag 30 is in the uninflated position. In the event of an impact, the impact sensor 88 may detect the impact and transmit a signal through the communication bus 90 to the computer 66, and the computer 66 may transmit a signal through the communication bus 90 to the inflator 32 to inflate the airbag 30 and to the lock 64 to inhibit movement of the brace 56 relative to the panel 28. In response to receiving such signal, the inflator 32 may discharge and inflate the airbag 30 to the inflated position to control kinematics of the seat 34 and/or the occupant. The panel 28 may provide a reaction surface to the airbag 30 in the inflated position.

Computing devices, such as the computer 66, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™ C, C++, Visual Basic, Java Script, Python, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

Use of "in response to" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle, comprising:
  a floor defining a seating area;
  a roof above the floor;
  a panel supported by the roof and pivotable from a stowed position at the roof to a deployed position in front of the seating area;
  a tray table supported by the panel;
  an airbag supported by the panel and inflatable from an uninflated position to an inflated position; and
  a pyrotechnic inflator in fluid communication with the airbag.

2. The vehicle of claim 1, wherein the panel in the deployed position includes a proximate end at the roof and a distal end spaced from the roof, the airbag being closer to the distal end than the proximate end.

3. The vehicle of claim 1, wherein the tray table is movable between a table stowed position and a table deployed position.

4. The vehicle of claim 3, wherein the airbag in the inflated position urges the tray table toward the table stowed position.

5. The vehicle of claim 3, wherein the tray table includes a bottom surface that faces the floor in the table deployed position, and wherein the airbag in the inflated position abuts the bottom surface of the tray table.

6. The vehicle of claim 1, wherein the airbag in the uninflated position is below the tray table when the panel is in the deployed position.

7. The vehicle of claim 1, wherein the airbag in the inflated position includes a pair of side bolsters and a depression between the side bolsters.

8. The vehicle of claim 7, wherein the pair of side bolsters and the depression are elongated along a vertical axis.

9. The vehicle of claim 7, wherein the pair of side bolsters and the depression face the seating area.

10. The vehicle of claim 1, wherein the airbag in the inflated position encloses an inflation chamber that surrounds a passage elongated between a pair of open ends.

11. The vehicle of claim 10, wherein the passage is outside the inflation chamber.

12. The vehicle of claim 1, further comprising a brace connected to the panel and the roof.

13. The vehicle of claim 12, wherein the brace extends forward from the panel, away from the seating area, and toward the roof.

14. The vehicle of claim 12, wherein the brace is slidable along at least one of the roof or the panel.

15. The vehicle of claim 12, further comprising a lock operatively engaged with the brace to selectively maintain the panel in the deployed position.

16. The vehicle of claim 1, wherein the panel in the stowed position is parallel to the roof, and in the deployed position is transverse to the roof.

17. The vehicle of claim 1, further comprising a vehicle seat supported by the floor within the seating area.

18. The vehicle of claim 1, further comprising a personal mobility device attachment assembly supported by the floor within the seating area.

19. A vehicle, comprising:
  a floor defining a seating area;
  a roof above the floor;
  a panel supported by the roof and pivotable from a stowed position at the roof to a deployed position in front of the seating area;
  a brace connected to the panel and the roof, the brace slidable along at least one of the roof or the panel;
  an airbag supported by the panel and inflatable from an uninflated position to an inflated position; and
  a pyrotechnic inflator in fluid communication with the airbag.

20. A vehicle, comprising:
a floor defining a seating area;
a roof above the floor;
a panel supported by the roof and pivotable from a stowed position at the roof to a deployed position in front of the seating area;
a brace connected to the panel and the roof;
a lock operatively engaged with the brace to selectively maintain the panel in the deployed position;
an airbag supported by the panel and inflatable from an uninflated position to an inflated position; and
a pyrotechnic inflator in fluid communication with the airbag.

* * * * *